United States Patent Office
3,311,627
Patented Mar. 28, 1967

3,311,627
PTERIDINE DERIVATIVES
Gerhard R. Wendt, Havertown, and Kurt W. Ledig, Philadelphia, Pa., assignors to American Home Products Corporation, New York, N.Y., a corporation of Delaware
No Drawing. Filed June 28, 1966, Ser. No. 561,051
3 Claims. (Cl. 260—251.5)

This invention relates to pteridine derivatives and more particularly to dihydro-cyclopenta[g]pteridines showing pharmacological activity, together with a method of manufacture.

The compounds having patentable merit are those which fall within and may be represented by a general formula:

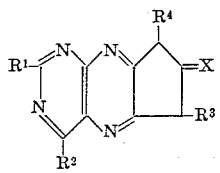

In the above formula, the designation $R^1$ is intended to represent either hydrogen, hydroxy, a lower alkyl or aryl (preferably phenyl) radical. The radical $R^2$ is meant to represent either hydrogen, a hydroxy or a lower alkyl group. $R^3$ represents hydrogen or carb(lower)alkoxy, while $R^4$ is intended to represent either hydrogen, lower alkyl or carb(lower)alkoxy. The symbol X stands for hydrogen, oxygen or the group

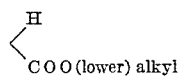

In reference to the expressions "lower alkyl" or "lower alkoxy," these are intended to involve radicals comprising 1 to 4 carbon atoms. It should be noted that where both $R^1$ and $R^2$ are hydroxy radicals, a small amount of final compound may conceivably be formed as a tautomer, where one of the hydrogen atoms of the hydroxyl migrates to an adjacent nitrogen.

The compounds of the invention have demonstrated pharmacological activity and in particular have been found to have substantial anti-inflammatory action when tested under standard and accepted pharmacological procedures in animals. They are, therefore, deemed to possess utility in experimental and comparative pharmacology.

The compounds described above are prepared by reacting a 4,5-diaminopyrimidine with a cyclopentane derivative in the presence of acetic acid or its equivalent. The reaction may be illustrated by the following reaction scheme:

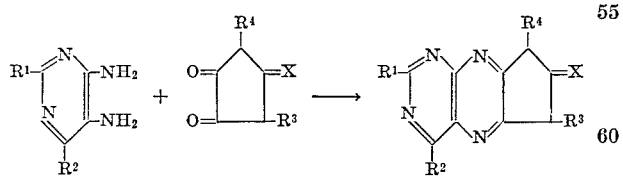

In the above reaction, the symbols $R^1$, $R^2$, $R^3$, $R^4$ and X have the same meanings as previously indicated. The reaction as illustrated takes place under refluxing conditions in an organic solvent medium in which the reactants are soluble. The solvents may be selected from the benzene type or the lower alkanols, depending on solubility. The desired product precipitates from the reaction mixture on cooling and may be separated in known manner.

For greater detail, the following examples will serve to further illustrate the process described above, but it should be understood that these examples are not intended to be limitative of the invention. The temperatures as given are in ° C.

EXAMPLE 1

8-ethyl-6,8-dihydro-7H-cyclopenta[g]-pteridin-7-one

React a suspension of 2.8 g. of 3-ethyl-1,2,4-cyclopentanetrione and 2.2. g. of 4,5-diaminopyrimidine in 1 ml. acetic acid and 50 ml. of toluene under refluxing conditions for 5 hrs. using a Dean-Stark water separator. Filter the precipitate and recrystallize from aqueous acetic acid followed by acetic acid to obtain the title compound; M.P. 259–260° dec.

Found: C, 61.72; H, 4.89; N, 25.85. $C_{11}H_{10}N_2O$ requires: C, 61.67; H, 4.71; N, 26.16%.

EXAMPLE 2

8-butyl-6,8-dihydro-7H-cyclopenta[g]-pteridin-7-one

Replace the 3-ethyl-1,2,4-cyclopentanetrione in the above Example 1 with 3.1 g. of 3-butyl-1,2,4-cyclopentanetrione in 1 ml. of acetic acid and 50 ml. of toluene and proceed in the manner disclosed to obtain the title compound.

EXAMPLE 3

7,8-dihydro-2,4-dihydroxy-6H-cyclopenta[g]-pteridine-6,7,8-tricarboxylic acid, triethyl ester React a mixture of 5.1 g. (30.0 mmoles) of 4,5-diaminouracil monohydrochloride and 2.5 g. (30.0 mmoles) of sodium acetate in 150 ml. of water with a warm solution of 9.4. g. (30.0 mmoles) of 4,5-dioxo-1,2,3,-cyclopentane-tricarboxylic acid, triethyl ester in 200 ml. of aqueous ethanol (75%). Heat the mixture to reflux for a few minutes (pH 7), filter and cool. Collect the resulting precipitate and recrystallize twice from N,N-dimethylformamide-methanol-water (50:47:3), to obtain 1.8 g. (14%) of the title compound, M.P. 198–201°, $\lambda_{max}^{KBr}$ 3.15, 5.78, 5.93 and 6.23µ.

Found: C, 50.15, H, 4.80; N, 13.63. $C_{18}H_{20}N_4O_8$· ½$H_2O$ requires: C, 50.35; H, 4.93; N, 13.05%.

EXAMPLE 4

8-ethyl-6,8-dihydro-4-methyl-7-H-cyclopenta[g]-pteridin-7-one

React 1.4 g. of 3-ethyl-1,2,4-cyclopentanetrione and 1.4 g. of 4,5-diamino-6-methylpyrimidine in suspension in 0.5 ml. of acetic acid and 25 ml. of toluene according to the manner described in Example 1 to obtain the title compound.

EXAMPLE 5

7,8-dihydro-4-hydroxy-2-methyl-6H-cyclopenta[g]-pteridine-6,7,8-tricarboxylic acid, triethyl ester React 5.8 g. of 4,5-diamino-6hydroxy-2-methylpyrimidine with 9.4 g. of 4,5-dioxo-1,2,3,-cyclopentane-tricarboxylic acid, triethyl ester and 1.5 ml. of acetic acid in 300 ml. of water and 50 ml. of ethanol, and otherwise carrying out the process in same manner described in Example 3 to obtain the title compound.

EXAMPLE 6

*7,8-dihydro-4-hydroxy-2-phenyl-6H-cyclopenta[g]-pteridine-6,7,8-tricarboxylic acid, triethyl ester*

React 4.0 g. of 4,5-diamino-6-hydroxy-2-phenylpyrimidine with 9.4 g. of 4,5-dioxo-1,2,3-cyclopentane-tricarboxylic acid, triethyl ester and 1.5 ml. of acetic acid in 300 ml. of water and 50 ml. of ethanol, and proceeding as described in Example 3 to yield the title compound.

EXAMPLE 7

*6,8-dihydro-2,4-dihydroxy-7H-cyclopenta[g]-pteridine-6,8-dicarboxylic acid, diethyl ester*

Replace 4,5 - dioxo - 1,2,3 - cyclopentane - tricarboxylic acid, triethyl ester in the Example 3 with 7.3 g. of 4,5-dioxo-1,3-cyclopentane-dicarboxylic acid, diethyl ester in 200 ml. of aqueous ethanol (75%) and proceed in the manner disclosed to obtain the title product.

The compounds prepared as indicated hereinabove may be administered either alone or in combination with other pharmacologically active ingredients. Whether singly or in combination, they may be used in the form of solid compositions for oral administration combined, if desired, with extenders or carriers that are relatively non-toxic or inert. They may be put into tablet capsules or powder form. On the other hand, they may be administered in the liquid form as a suspension or solubilized in a suitable vehicle for parenteral use. Useful pharmacological action will be achieved if the active ingredient is supplied in a dosage range from about 20 to 200 mg./kg. of body weight.

We claim:

1. A compound represented by the formula:

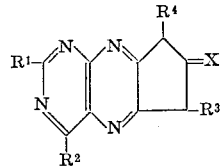

in which $R^1$ represents a member of the group consisting of hydrogen, hydroxy, lower alkyl and phenyl, while $R^2$ stands for a member of the group consisting of hydrogen, hydroxy, and lower alkyl, with $R^3$ representing a member of the group consisting of hydrogen and carb(lower)alkoxy and $R^4$ is selected from the group consisting of hydrogen, lower alkyl and carb(lower)alkoxy, the symbol X representing a member of the group consisting of hydrogen, oxygen and the radical,

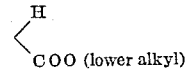

2. As a compound of claim 1; 8-ethyl-6,8-dihydro-7H-cyclopenta[g]-pteridin-7-one.

3. As a compound of claim 1; 7,8-dihydro-2,4-dihydroxy - 6H - cyclopenta[g]pteridin - 6,7,8-tricarboxylic acid, triethyl ester.

No references cited

NICHOLAS S. RIZZO, *Primary Examiner.*